United States Patent
Skudlarek et al.

(10) Patent No.: US 10,348,509 B2
(45) Date of Patent: Jul. 9, 2019

(54) TOLERANT OF ABSOLUTE OFFSETS PHYSICAL UNCLONABLE FUNCTION DEVICE

(71) Applicant: Mentor Graphics Corporation, Wilsonville, OR (US)

(72) Inventors: Joseph P. Skudlarek, Lake Oswego, OR (US); Wei-Che Wang, Los Angeles, CA (US); Michael Chen, Happy Valley, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 85 days.

(21) Appl. No.: 14/964,192

(22) Filed: Dec. 9, 2015

(65) Prior Publication Data
US 2017/0134175 A1    May 11, 2017

Related U.S. Application Data

(60) Provisional application No. 62/251,829, filed on Nov. 6, 2015.

(51) Int. Cl.
*H04L 9/24* (2006.01)
*G06F 21/73* (2013.01)
(Continued)

(52) U.S. Cl.
CPC ............ *H04L 9/3278* (2013.01); *G06F 7/588* (2013.01); *G06F 21/73* (2013.01); *G09C 1/00* (2013.01);
(Continued)

(58) Field of Classification Search
None
See application file for complete search history.

(56) References Cited

U.S. PATENT DOCUMENTS

| 8,782,396 B2 * | 7/2014 | Ziola | G06F 21/31 |
| | | | 713/155 |
| 2017/0024339 A1 * | 1/2017 | Watanabe | G06F 13/20 |
| 2017/0063559 A1 * | 3/2017 | Wallrabenstein | H04L 9/3278 |

FOREIGN PATENT DOCUMENTS

WO   WO 2015148659 A1 * 10/2015 ............. G06F 21/73

OTHER PUBLICATIONS

Randomly Driven Fuzzy Key Extraction of Unclonable Images. Shariati et al. IEEE(2010).*

(Continued)

*Primary Examiner* — Venkat Perungavoor
(74) *Attorney, Agent, or Firm* — Mentor Graphics Corporation

(57) ABSTRACT

This application discloses a physical unclonable function device including physical unclonable function units, each capable of generating an output. The physical unclonable function device can utilize transforms to derive bits from the outputs and utilize the derived bits to generate an identifier for the physical unclonable function device. An inspection configuration tool can sample multiple outputs from each of the physical unclonable function units, identify a transforms to perform on a future output for each of the physical unclonable function units based on a distribution of values corresponding to the sampled outputs. The inspection configuration tool can configure the physical unclonable function device to perform the transforms on the future outputs of the physical unclonable function units. Embodiments will be described below in greater detail.

15 Claims, 8 Drawing Sheets

TOLERANT OF ABSOLUTE OFFSETS PHYSICAL UNCLONABLE FUNCTION DEVICE

(51) Int. Cl.
*H04L 9/32* (2006.01)
*H04L 9/10* (2006.01)
*G06F 7/58* (2006.01)
*G09C 1/00* (2006.01)

(52) U.S. Cl.
CPC ............ *H04L 9/10* (2013.01); *H04L 2209/12* (2013.01); *H04L 2209/24* (2013.01)

(56) References Cited

OTHER PUBLICATIONS

PUF-Based Entity Identification and Authentication.Maes. Physically Unclonable Functions.2013.*
Exploiting metastability and thermal noise to build a reconfigurable hardware random number generator. Lim et al. SPIE. (Year: 2005).*
Physically Unclonable Functions: Manufacturing Variability as an Unclonable Device Identifier. Verbauwhede et al. ACM. (Year: 2011).*
A Design of Ring Oscillator based PUF on FPGA, Filip Kodytek arid Robert Lorencz. 2015 EEEE 18th International Symposium on Design and Diagnostics of Electronic Circuits and Systems, pp. 37-42.

* cited by examiner

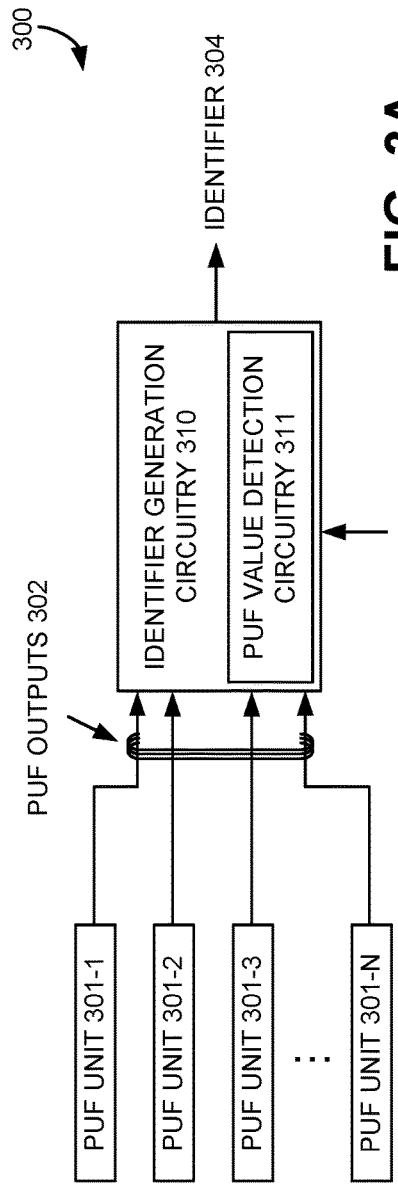
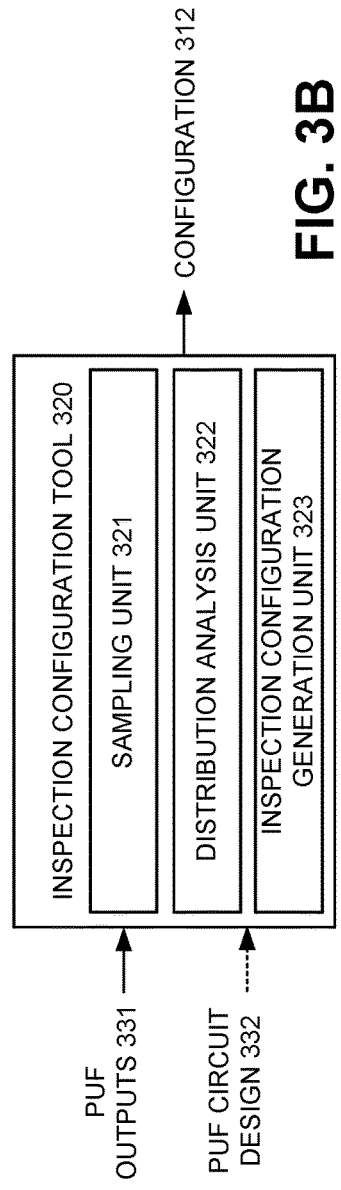
FIG. 3A
FIG. 3B

RING OSCILLATOR EXAMPLE

ANOTHER RING OSCILLATOR EXAMPLE

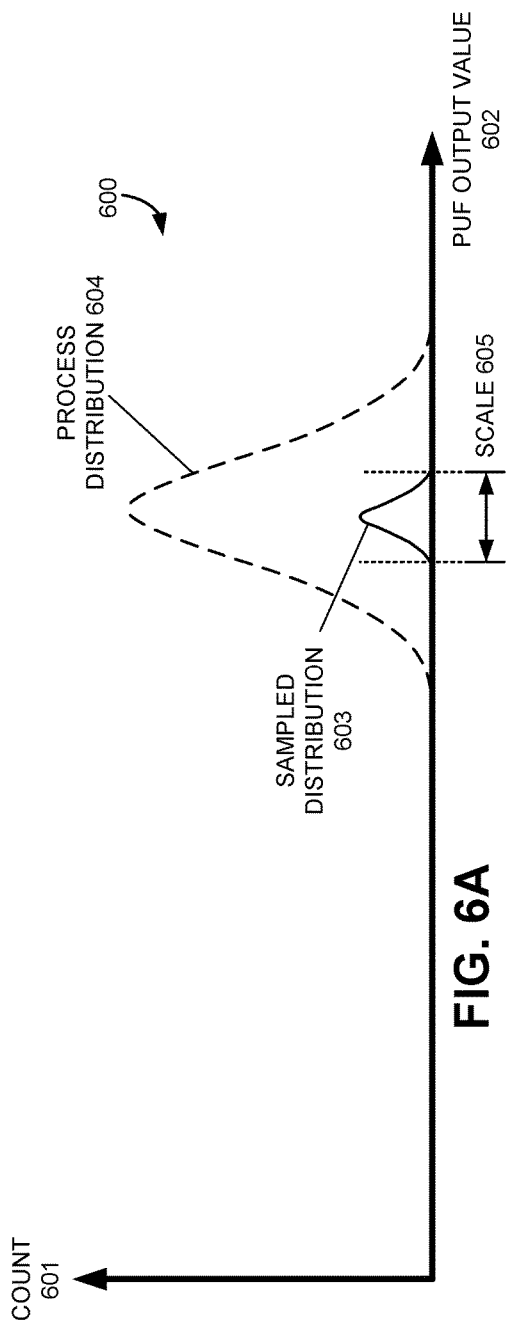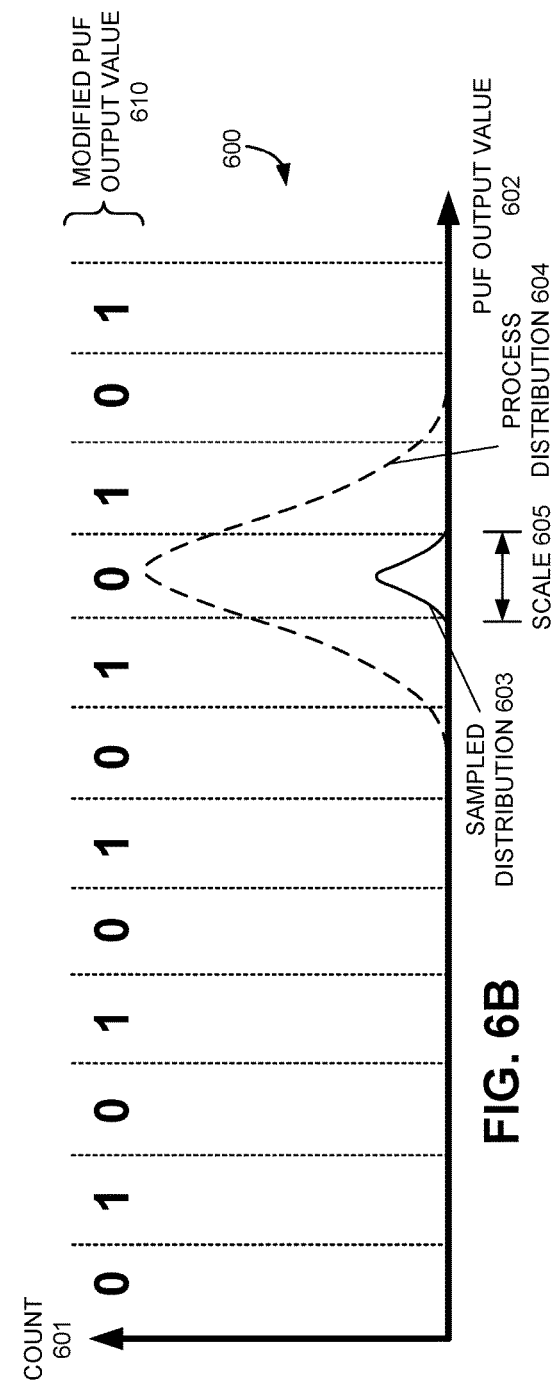

US 10,348,509 B2

TOLERANT OF ABSOLUTE OFFSETS PHYSICAL UNCLONABLE FUNCTION DEVICE

RELATED APPLICATION

This patent application claims priority to U.S. Provisional Patent Application No. 62/251,829, filed Nov. 6, 2015, which is incorporated by reference herein.

TECHNICAL FIELD

This application is generally related to electronic circuits and their design and, more specifically, to a tolerant of absolute offsets physical unclonable function device.

BACKGROUND

Many circuit developers utilize third-party fabricators or foundries to manufacture integrated circuit chips or systems implementing their circuit designs. The lack of direct control over the manufacturing of the chips or systems can lead to various manufacturing-related vulnerabilities. In an attempt to combat some of these manufacturing-related vulnerabilities, circuit developers can include security circuitry having at least one physical unclonable function (PUF) into their circuit designs. Since physical unclonable functions have physical characteristics that, when manufactured, can differ based on random manufacturing variations, the inclusion of the security circuitry in the circuit design can render each manufactured chip or system unique (or near unique) even though they are manufactured utilizing the same circuit design. The circuit developers can leverage this hardware-uniqueness by having the security circuitry authenticate or lock each manufactured chip or system after manufacture.

Physical unclonable functions, such as those included in security circuitry discussed above or implemented in other systems, typically include physical characteristics, such as a signal path delay, strength of bi-stable latch circuitry, capacitance, or the like, which can vary randomly and often subtly during manufacturing. The physical unclonable functions can generate a unique (or near unique) output based on those physical characteristics as manufactured. In order to have an effective physical unclonable function, any physical unclonable function manufactured based on a common design should be able to output a bit with an approximately even chance having a value corresponding to a 0 or a 1, while also being able to consistently output that bit value over time. Thus, it should be unknown from the design which bit value the physical unclonable function will output, as the value should be dependent on manufacturing variations, but once manufactured, regardless of which bit value the physical unclonable function outputs, the physical unclonable function should output that same bit value consistently over time.

Since physical unclonable functions rely of subtle and random manufacturing variations for their ability to provide a random output bit value, conventional physical unclonable functions are typically designed at the physical-level. For example, a ring oscillator can have multiple alternate signal paths, each physically designed to have an identical propagation delay, but when manufactured, random variations can cause the delays in the signal paths to differ. The ring oscillator can include circuitry to output a single bit, the value of which corresponds to the difference in the delay in the signal paths. While a physical design of a physical unclonable function can be incorporated into a design layout, for example, as a macro or the like, designing circuitry at a physical-level can have several drawbacks. For example, physical-level designs are not process agnostic, meaning a different physical-level design for a physical unclonable function may have to be generated for each different manufacturing process, process node, or configurable hardware implementation, such as a Field Programmable Gate Array (FPGA), or the like. Furthermore, since physical-level designing of this type is often performed manually, it can be time-consuming, especially when the physical unclonable function is implemented in multiple different manufacturing processes or different hardware implementations.

SUMMARY

This application discloses a physical unclonable function device including physical unclonable function units, each capable of generating an output. The physical unclonable function device can utilize transforms to derive bits from the outputs and utilize the derived bits to generate an identifier for the physical unclonable function device. An inspection configuration tool can sample multiple outputs from each of the physical unclonable function units, identify a transforms to perform on a future output for each of the physical unclonable function units based on a distribution of values corresponding to the sampled outputs. The inspection configuration tool can configure the physical unclonable function device to perform the transforms on the future outputs of the physical unclonable function units. Embodiments will be described below in greater detail.

DESCRIPTION OF THE DRAWINGS

FIG. 3A illustrates an example tolerant of absolute offsets physical unclonable function device according to various examples of the invention.

FIG. 3B illustrates an example of an inspection configuration tool to determine an inspection configuration for a tolerant of absolute offsets physical unclonable function device according to various embodiments of the invention.

FIGS. 6A-6C show example histograms for determining a distribution-based transform to be implemented for a tolerant of absolute offsets physical unclonable function device according to various embodiments of the invention.

DETAILED DESCRIPTION

Illustrative Operating Environment

The execution of various electronic design automation processes and supply chain security protocols according to embodiments of the invention may be implemented using computer-executable software instructions executed by one or more programmable computing devices. Because these embodiments of the invention may be implemented using software instructions, the components and operation of a programmable computer system on which various embodiments of the invention may be employed will first be described. Further, because of the complexity of some electronic design automation processes, the large size of many circuit designs, and supply chain security protocols, various electronic design automation tools, security servers, or the like, can be configured to operate on a computing system capable of simultaneously running multiple processing threads.

Figure 1:
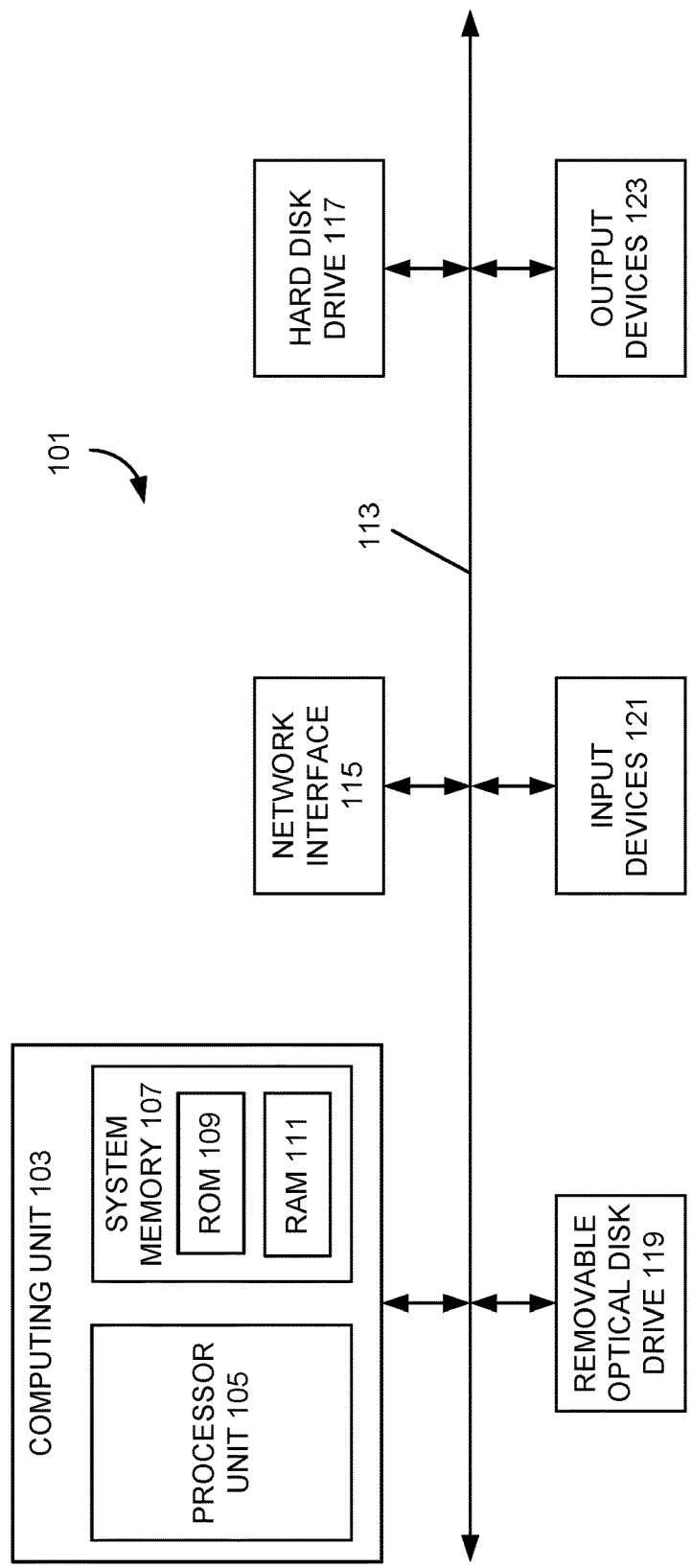
FIGS. 1 and 2 illustrate an example of a computer system of the type that may be used to implement various embodiments of the invention.

Various examples of the invention may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments of the invention may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
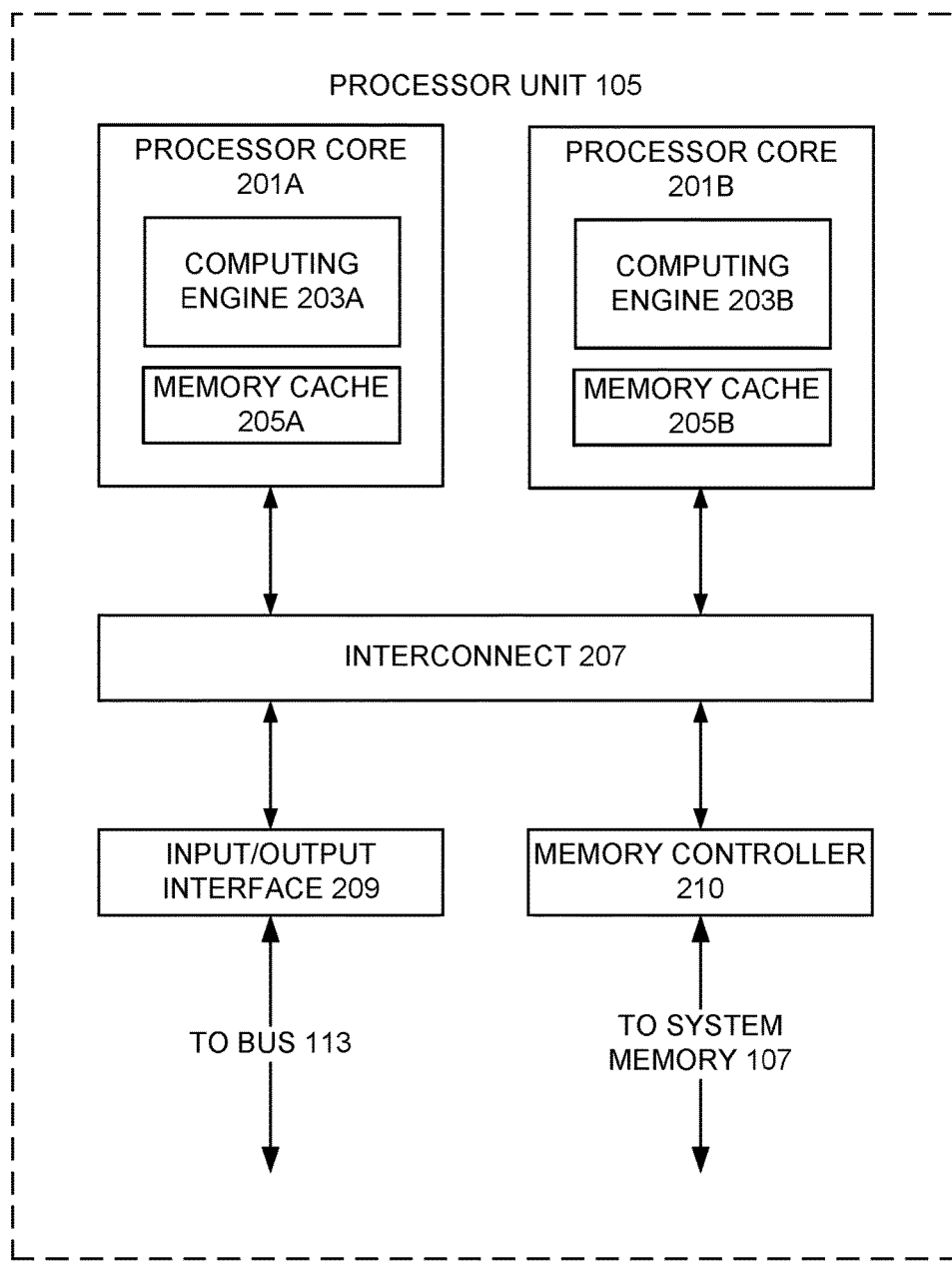

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations of the invention, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments of the invention.

Tolerant of Absolute Offsets Physical Unclonable Function Device

FIG. 3A illustrates an example tolerant of absolute offsets physical unclonable function (PUF) device 300 according to various examples of the invention. Referring to FIG. 3A, the tolerant of absolute offsets physical unclonable function device 300 can generate an identifier 304, the value of which can be based on multiple physical unclonable function units 301-1 to 301-N included in the tolerant of absolute offsets physical unclonable function device 300. Each of the physical unclonable function units 301-1 to 301-N can include one or more components having physical characteristics that, when manufactured, randomly fall within a tolerance range for a particular manufacturing process. These physical characteristics, in some embodiments, can include signal path delay, strength of bi-stable latch circuitry, capacitance, or the like.

The tolerant of absolute offsets physical unclonable function device 300 can set values of bits in the identifier 304 based on where those physical characteristics fell in the tolerance range during manufacture. Thus, multiple manufactured instances of the tolerant of absolute offsets physical unclonable function device 300 can generate identifiers, like identifier 304, with different values according to where in a manufacturing tolerance range the physical characteristics of the physical unclonable function units 301-1 to 301-N landed during manufacture. This random variation in an identifier 304 for each manufactured instance of the tolerant of absolute offsets physical unclonable function device 300 can ascribe hardware uniqueness or near uniqueness to the manufactured instances of the tolerant of absolute offsets physical unclonable function device 300 even when they were manufactured with the same process, utilizing the same circuit design. The tolerant of absolute offsets physical unclonable function device 300 can be implemented as a "weak" or "strong" physical unclonable function, which can generate a different value for the identifier 304 in response to different challenges or inputs (not shown) to the tolerant of absolute offsets physical unclonable function device 300. Examples of a physical unclonable function unit will be described below in greater detail with reference to FIGS. 4A and 4B, before returning to describe the remainder of the FIG. 3A.

Figure 4A:
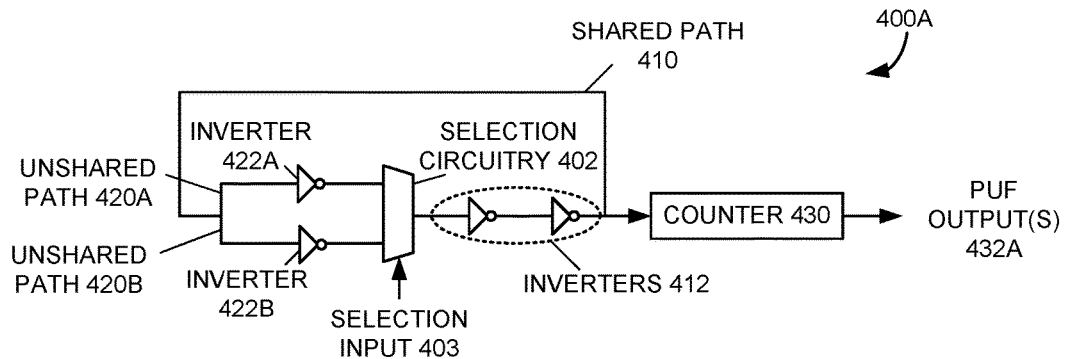
FIGS. 4A and 4B illustrate example ring oscillators implemented in physical unclonable function units according to various examples of the invention.
Figure 4B:
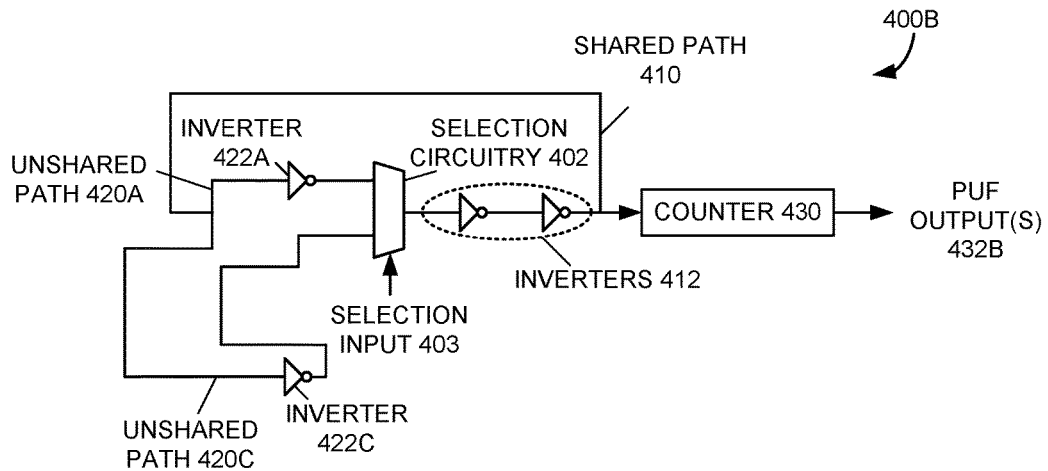

FIGS. 4A and 4B illustrate example ring oscillators implemented in physical unclonable function units according to various examples of the invention. Referring to FIG. 4A, a physical unclonable function unit can include a ring oscillator 400A with multiple alternate signal paths that can each propagate a signal in a corresponding loop. The ring oscillator 400A can include a first signal path, which, in this embodiment, includes both a shared path 410 having multiple inverters 412 and an unshared path 420A having an inverter 422A. The ring oscillator 400A can include a second signal path, which, in this embodiment, includes both the shared path 410 and an unshared path 420B having an inverter 422B. Since both of the first and the second signal paths include an odd number of inverters 422A, 422B, and 412, propagation of the signal can invert or toggle the signal between a logical high level and a logical low level on each loop through either of the first signal path or the second signal path. In this example, the ring oscillator 400A can be designed so that the first and second signal paths have an identical propagation delay, but during manufacture, the propagation delay of the first and second signal paths can deviate from each other based on manufacturing tolerances, for example, of wire length or inverter characteristics.

The ring oscillator 400A can include selection circuitry 402, for example, a multiplexer or the like, which, based on a selection input 403, can select which of the first signal path or the second signal path propagates the signal. The ring oscillator 400A can include a counter 430 coupled to the shared path 410, which can increment or decrement in response to an inversion or a toggle of a signal propagating through either of the signal paths. The counter 430 can output at least one PUF output 432A, which can correspond to its counter value or a portion thereof.

In an example operation, the ring oscillator 400A can utilize the selection circuitry 402 to select the first signal path for signal propagation. The counter 430 can increment its value for each loop that the signal makes in the first signal path based on the toggling or inverting of the signal on each loop through the first signal path. After a predetermined period of time, the ring oscillator 400A can utilize the selection circuitry 402 to switch its selection to the second signal path for signal propagation. The counter 430 can decrement its value for each loop that the signal makes in the second signal path based on the toggling or inverting of the signal on each loop through the second signal path. After the predetermined period of time again passes, the counter 430 can output its value (or a portion thereof) as a PUF output 432A. The PUF output 432A can correspond to a difference in a number of loops the signal makes for each of the signal paths.

Since, in this example, the ring oscillator 400A was designed and implemented in a physical layout to have identical propagation delay for the first and second signal paths, the difference in the number of loops the signal makes for each of the signal paths can be attributable to random manufacturing variances. In some embodiments, the counter 430 may output its value after each predetermined time period, for example, one PUF output 432A corresponding to a loop-count for each signal path, and another circuit or device external to the ring oscillator 400A can determine a difference in a number of loops the signal makes for each of the signal paths from the PUF outputs 432A. In yet other embodiments, the ring oscillator 400A can determine an amount of time that elapses when the signal loops in the first signal path for a predetermined number of times. The ring oscillator 400A can utilize the selection circuitry 402 to switch its selection to the second signal path for signal propagation. The counter 430 can decrement its value for each loop that the signal makes in the second signal path. After the determined amount of time, the counter 430 can output its value (or a portion thereof) as a PUF output 432A.

Referring to FIG. 4B, a physical unclonable function unit can include a ring oscillator 400B with multiple signal paths that can each propagate a signal in a corresponding loop. The ring oscillator 400B is similar to the ring oscillator 400A described above with reference to FIG. 4A, except a design of the ring oscillator 400B includes signal paths that do not have equal or identical signal propagation delays. For example, the ring oscillator 400B can include a first signal path similar to the first signal path in the ring oscillator 400A, which includes both a shared path 410 having multiple inverters 412 and an unshared path 420A having an inverter 422A. A second signal path in the ring oscillator 400B, however, can include both the shared path 410 and an unshared path 420C having an inverter 422C.

In some embodiments, a portion of a difference in wire length for the unshared paths 420A and 420C can be introduced in the design, for example, during a place and routing process. The ring oscillator 400B may be designed at a functional-level, such as at a register transfer level (RTL) of abstraction, which subsequently can be utilized to generate a physical layout of the ring oscillator 400B with a place and route tool. This abstraction of a ring oscillator 400B to a functional-level can allow a common functional design to be implemented in multiple different physical deployments, for example, manufactured at different process nodes, in a reconfigurable hardware device, or the like.

The ring oscillator 400B also can include selection circuitry 402 and a counter 430 similar to the ring oscillator 400A in FIG. 4A. In an example operation, the ring oscillator 400B can utilize the selection circuitry 402 to select the first signal path for signal propagation. The counter 430 can increment its value for each loop that the signal makes in the first signal path based on the toggling or inverting of the signal on each loop through the first signal path. After a predetermined period of time, the ring oscillator 400B can utilize the selection circuitry 402 to switch its selection to the second signal path for signal propagation. The counter 430 can decrement its value for each loop that the signal makes in the second signal path based on the toggling or inverting of the signal on each loop through the second signal path. After the predetermined period of time again passes, the counter 430 can output its value as a PUF output 432B. The PUF output 432B can correspond to a difference in a number of loops the signal makes for each of the signal paths.

Since the ring oscillator 400B was implemented in a physical layout to not have identical or equal propagation delay for the first and second signal paths, for example, unshared paths 420A and 420C do not have the same implemented wire length, the difference in the number of loops the signal makes for each of the signal paths can be attributable to both random manufacturing variances and to an implementation-induced propagation delay differential.

Referring back to FIG. 3A, as discussed above, the physical unclonable function units 301-1 to 301-N can generate corresponding PUF outputs 302 based on their physical characteristics, which can vary randomly during manufacture of the tolerant of absolute offsets physical unclonable function device 300. The tolerant of absolute offsets physical unclonable function device 300 can include identifier generation circuitry 310 to generate the identifier 304 based on the PUF outputs 302. Since the PUF outputs 302 can be based on random manufacturing variances and also possibly on a physical layout implementation of the physical unclonable function units 301-1 to 301-N, the identifier generation circuitry 310 can filter the PUF outputs 302 in an attempt to isolate the random manufacturing variances of the physical characteristics of the physical unclonable function units 301-1 to 301-N.

The identifier generation circuitry 310 can include PUF value detection circuitry 311 to identify the random manufacturing variances annunciated in the PUF outputs 302 based on a configuration 312, and generate the identifier 304 based on the random manufacturing variances isolated from the PUF outputs 302. In some embodiments, the configuration 312 can specify an operation to perform on the PUF outputs 302 and specify bit or bits within each of the modified PUF outputs to extract. The identifier generation circuitry 310 can utilize the extracted bit or bits to generate the identifier 304. Embodiments of PUF value detection will be described below in greater detail.

FIG. 3B illustrates an example of an inspection configuration tool 320 to determine the configuration 312 for a tolerant of absolute offsets physical unclonable function device 300 according to various embodiments of the invention. Referring to FIG. 3B, the inspection configuration tool 320 can generate the configuration 312 based on received PUF outputs 331 from a tolerant of absolute offsets physical unclonable function device. The inspection configuration tool 320 can couple to the tolerant of absolute offsets physical unclonable function device to receive the PUF outputs 331 from one or more of its PUF units or the inspection configuration tool 320 can be included within the tolerant of absolute offsets physical unclonable function device, for example, in PUF value detection circuitry. In some embodiments, the inspection configuration tool 320 can generate the configuration 312 based on a PUF circuit design 332 describing a physical layout of the tolerant of absolute offsets physical unclonable function device.

The inspection configuration tool 320 can include a sampling unit 321 to receive PUF outputs 331 from one or more PUF units in the tolerant of absolute offsets physical unclonable function device. For example, the sampling unit 321 can receive multiple PUF outputs 331 from each PUF unit in the tolerant of absolute offsets physical unclonable function device. In some embodiments, the inspection configuration tool 320 can derive estimated or expected PUF outputs from the PUF circuit design 332 to utilize as PUF outputs 331. For example, the inspection configuration tool 320 can simulate or emulate the PUF circuit design 332 to ascertain the PUF outputs 331. In other examples, the inspection configuration tool 320 can measure physical characteristics in the PUF circuit design 332, such as wire length, device types or structures, or the like, and estimate a sampling of PUF outputs 331 based on the measurements.

The inspection configuration tool 320 can include a distribution analysis unit 322 to analyze the sampled PUF outputs for each of the PUF units to determine a distribution of the values of the sampled PUF outputs. The distribution analysis unit 322, in some embodiments, can identify at least one transform or other operation that, when applied to future PUF outputs, can provide a value that remains stable across those future PUF outputs for a PUF unit, while also allowing different manufactured instances to identify different values depending where the physical characteristics randomly fall within a tolerance range for a particular manufacturing process. Embodiments of distribution analysis on sampled PUF outputs will be described below in greater detail.

The inspection configuration tool 320 can include an inspection configuration generation unit 323 to generate the configuration 312 based on the sampled distribution of the PUF outputs. The configuration 312 can describe at least one operation or transformation for PUF value detection circuitry to perform, which can identify a value for identifier generation circuitry 310 to utilize in the identifier 304 output from a tolerant of absolute offsets physical unclonable function device. In some embodiments, the configuration 312 can identify at least one bit location for each PUF unit in the tolerant of absolute offsets physical unclonable function device based on the analysis of the distribution of the sampled PUF outputs for each of the PUF units by the distribution analysis unit 322.

Although FIG. 3B shows the inspection configuration tool 320 generating and outputting the configuration 312, in some embodiments, the inspection configuration tool 320 can modify the PUF circuit design 332 based on the sampled distribution of the PUF outputs. For example, the inspection configuration tool 320 can configured the PUF value detection circuitry 311 or add additional circuitry in the PUF circuit design 332 capable of implementing the operation transformation.

Figure 5:
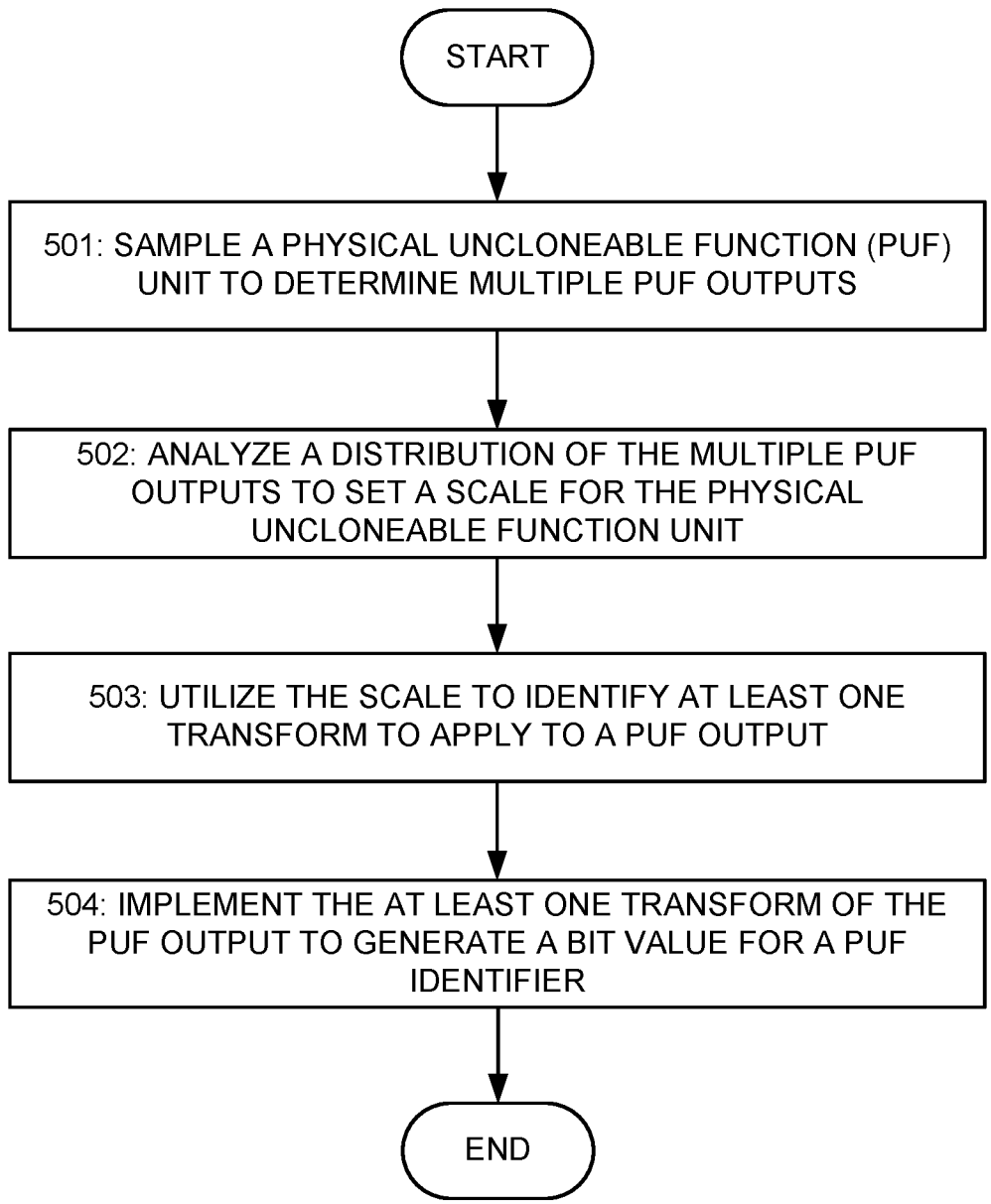
FIG. 5 illustrates an example flowchart for determining at least one distribution-based transform to be implemented for a tolerant of absolute offsets physical unclonable function device according to various embodiments of the invention.

FIG. 5 illustrates an example flowchart for determining at least one distribution-based transform to be implemented for a tolerant of absolute offsets physical unclonable function device according to various embodiments of the invention. Referring to FIG. 5, in a block 501, an inspection configuration tool, for example, implemented by a computing system or in circuitry within or external to the tolerant of absolute offsets unclonable function device, can sample a physical unclonable function (PUF) unit to determine multiple PUF outputs. Each of the PUF outputs can include a predetermined number of bits. For example, when a PUF unit corresponds to a ring oscillator in FIG. 4A or 4B, the PUF output can have a bit length corresponding to the length of the value (or a portion thereof) stored in the counter of the ring oscillator.

In a block 502, the inspection configuration tool can analyze a distribution of the multiple PUF outputs to set a scale for the physical unclonable function unit. In some embodiments, the inspection configuration tool can determine a standard deviation, a spread between a maximum value and a minimum value, a quartile distribution, or other metric capable of describing the distribution of the multiple PUF outputs. Based on the standard deviation, a spread between a maximum value and a minimum value, a quartile distribution, or other metric, the inspection configuration tool can determine a width of a region (in a value range) or scale that could include the distribution of the multiple PUF outputs within a preset threshold. For example, the inspection configuration tool could set the width of a region to be seven times the standard deviation. In some embodiments, the inspection configuration tool can identify a width of the region that can include the distribution of the multiple PUF outputs within the preset threshold, and then select a scale for the physical unclonable function unit based on the width of the region.

In a block 503, the inspection configuration tool can utilize the scale to identify at least one transform to apply to a PUF output. For example, the inspection configuration tool can utilize the scale to determine a mathematical transform or other operation to perform on a PUF output in order to identify a PUF value capable of being utilized in an identifier for a tolerant of absolute offsets physical unclonable function device.

In some embodiments, the inspection configuration tool can transform the PUF outputs by dividing the PUF outputs by the scale. For example, when the quotient or result of the division corresponds to multiple bits, the inspection configuration tool can identify another transform to identify at least one PUF value capable of being utilized in the identifier for the tolerant of absolute offsets physical unclonable function device. For example, the inspection configuration tool can set the PUF value to a '0' or a '1' based on whether the multi-bit quotient of the division is even or odd, respectively.

In other embodiments, rather than dividing by the scale, which can divide the possible value range of the PUF output into equal bins or groups of bit values, the inspection configuration tool can transform the PUF outputs into bins having different numbers of bit values. Embodiments of the distribution-based transform to be implemented for the tolerant of absolute offsets physical unclonable function device will be described below in greater detail.

In a block 504, the inspection configuration tool can implement the at least one transform of a PUF output in the tolerant of absolute offsets physical unclonable function device to generate a bit value for a portion of a PUF identifier. In some embodiments, the inspection configuration tool can generate a configuration for the tolerant of absolute offsets physical unclonable function device, which can allow the tolerant of absolute offsets physical unclonable function device, such as its identifier generation circuitry, to implement the identified transform(s). In other embodiments, the inspection configuration tool can modify a PUF circuit design to include circuitry capable of implementing the identified transform(s).

Figure 6C:
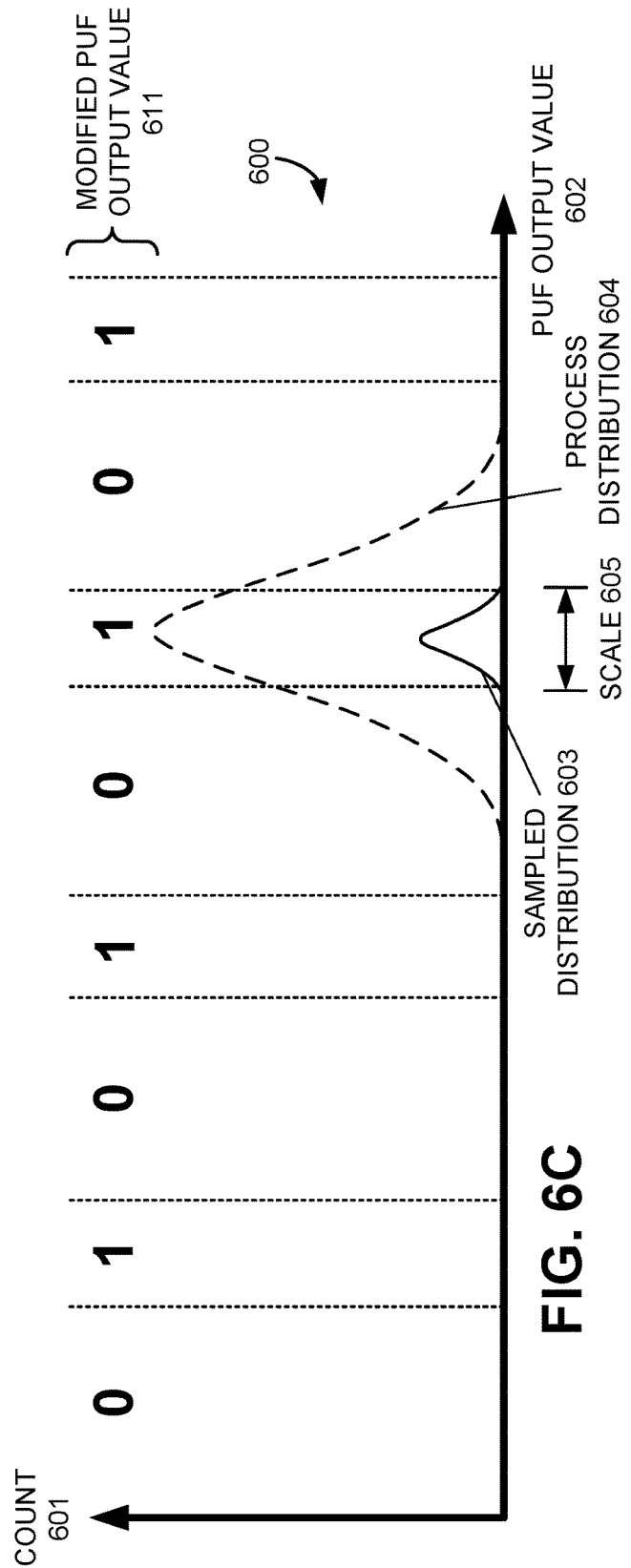

FIGS. 6A-6C show example histograms for determining a distribution-based transform to be implemented for a tolerant of absolute offsets physical unclonable function device according to various embodiments of the invention. Referring to FIGS. 6A-6C, a histogram 600 shows a number or count 601 of values 602 of PUF outputs for a tolerant of absolute offsets physical unclonable function device.

The histogram 600 can include a sampled distribution 603 that corresponds to sampled values of the PUF outputs for a PUF unit in a tolerant of absolute offsets unclonable function device, for example, sampled by an inspection configuration tool. The sampled distribution 603 can show both a range of the sampled values of the PUF outputs and a density or frequency in which each of those values in the sampled distribution 603. In some embodiments, the sampled distribution 603 can be a probability density function derived from the sampled values of the PUF outputs, from a PUF circuit design, or the like.

The histogram 600 also can include a process distribution 604 that corresponds to potential values of a PUF output for a PUF unit in a tolerant of absolute offsets unclonable function device given the manufacturing process variations for physical characteristics in the PUF unit. The process distribution 604 can show both a range of the potential values of the PUF output and a density or frequency in which each of those values in the process distribution 604. In some embodiments, the process distribution 604 can be a probability density function derived from sampled values of the PUF outputs, from a PUF circuit design, manufacturing tolerance ranges, or the like.

The sampled distribution 603 of the PUF outputs can have a scale 605 that corresponds to a width of the values in the sampled distribution 603. For example, the scale can be set to be equal to the width of the values in the sampled distribution, or the scale can be selected based on the width. In some embodiments, the width can correspond to a value range that can include approximately 97% of the values in the sampled distribution 603. In some embodiments, the scale 605 can have a width corresponding to seven times a standard deviation of the sampled distribution 603 or some other metric capable of describing a spread of the sampled distribution 603.

Referring to FIG. 6B, the histogram 600 is annotated with information corresponding to bit values for a modified PUF output 610. The PUF output value range 602 can be transformed by a division operation corresponding to the scale 605, for example, where the possible PUF out values are divided into equal-sized bins or regions, each having a corresponding bit value. In this example, the PUF output value range 602 can be divided by 17 creating equal-sized groups of PUF output values 602. In other examples, the divisor can be another number based on the distribution or scale of the sampled PUF outputs, which in some embodiments can correspond to a number in the Fibonacci sequence. Each region or bin in the PUF output values 602 as divided can, in some embodiments, be further transformed into the modified PUF output value 610. For example, when the quotients or results of the division each correspond to multiple bits, the multiple bits can be further reduced to modified PUF values 610 based on whether the multi-bit quotient of the division is even or odd, respectively, for each of the regions or bins.

Referring to FIG. 6C, the histogram 600 is annotated with information corresponding to bit values for a modified PUF output 611. The PUF output value range 602 can be transformed by an apportioning operation corresponding to the scale 605, for example, where the possible PUF out values are split into non-equal-sized bins or regions, each having a corresponding bit value. Each region or bin in the PUF output values 602 can, in some embodiments, be further transformed into the modified PUF output value 611. For example, when the quotients or results of the splitting each correspond to multiple bits, the multiple bits can be further reduced to modified PUF values 611 based on whether the multi-bit quotient of the division is even or odd, respectively, for each of the regions or bins.

In some embodiments, the scale 605 can be utilized to partition the PUF output value range 602 into bins or groups of contiguous PUF output values having varying width. Each bin can be tagged with a value, such as a '0' or a '1', which can correspond to the modified PUF output value 611. In some embodiments, adjacent bins or groups can be assigned an alternating value. Rather than attempt to identify one or more transformations to perform on future PUF outputs, however, this embodiment can map the PUF output value to a bin or group and its corresponding assigned tag value. The tag value can be utilized to produce a PUF identifier for the tolerant of absolute offsets physical unclonable function device.

Figure 7:
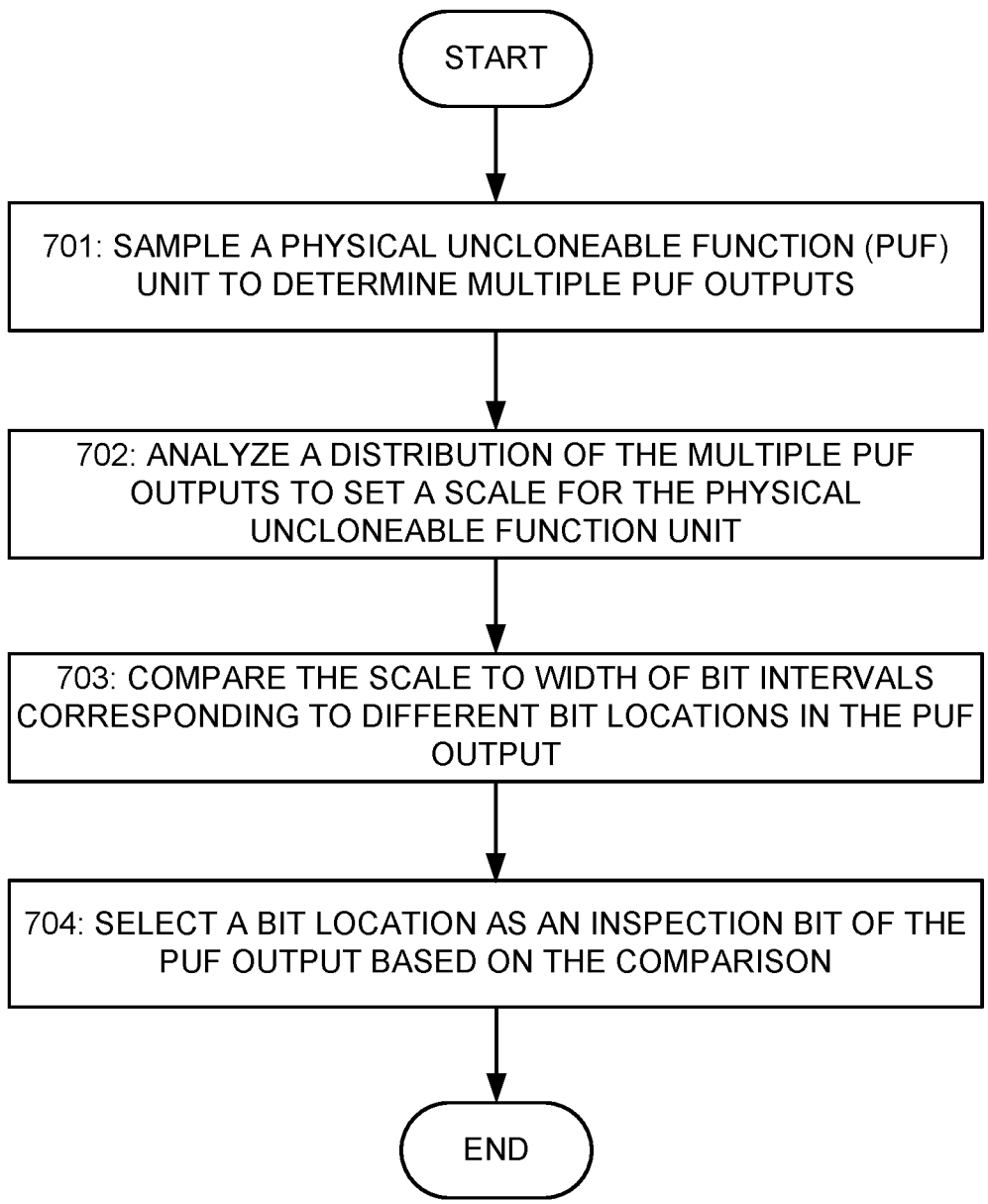
FIG. 7 illustrates another example flowchart for determining an inspection configuration of a tolerant of absolute offsets physical unclonable function device according to various embodiments of the invention.

FIG. 7 illustrates another example flowchart for determining an inspection configuration for a tolerant of absolute offsets physical unclonable function device according to various embodiments of the invention. Referring to FIG. 7, in a block 701, an inspection configuration tool, for example, implemented by a computing system or in circuitry within or external to the tolerant of absolute offsets unclonable function device, can sample a physical unclonable function (PUF) unit to determine multiple PUF outputs. Each of the PUF outputs can include a predetermined number of bits. For example, when a PUF unit corresponds to a ring oscillator in FIG. 4A or 4B, the PUF output can have a bit length corresponding to a length of a value (or a portion thereof) stored in the counter of the ring oscillator.

In a block 702, the inspection configuration tool can analyze a distribution of the multiple PUF outputs f to set a scale for the physical unclonable function unit. In some embodiments, the inspection configuration tool can determine a standard deviation or other metric capable of describing the width of the distribution of the multiple PUF outputs. Based on the standard deviation or other metric, the inspection configuration tool can determine a width of a region (in a value range) or scale that could include the distribution of the multiple PUF outputs within preset threshold. For example, the inspection configuration tool could set the width of a region to be seven times the standard deviation.

In a block 703, the inspection configuration tool can compare the scale to width of bit intervals or bins corresponding to different bit locations in the PUF output. The inspection configuration tool can determine the widths of bit intervals corresponding to different bit locations in the PUF output in a number of different ways.

In a block 704, the inspection configuration tool can select a bit location as an inspection bit of the PUF output based on the comparison. In some embodiments, the inspection configuration tool can identify bit intervals that can be large enough to encapsulate most of the sampled distribution of PUF outputs, and select a bit location corresponding to one of the identified bit intervals.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory included within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   sampling a physical unclonable function unit in a physical unclonable function device to identify a plurality of outputs;
   determining a width of a distribution of values corresponding to the sampled outputs;
   setting a scale for the physical unclonable function unit based, at least in part, on the width of the distribution of values corresponding to the sampled outputs;
   identifying a transform for the physical unclonable function unit based, at least in part, on the scale for the physical unclonable function unit;
   configuring the physical unclonable function device to perform the transform on a future output of the physical unclonable function unit, wherein the physical unclonable function device is configured to generate an identifier based, at least in part, on a result of performance of the transform on the future output of the physical unclonable function unit;
   when the result of the performance of the transform on the future output of the physical unclonable function unit corresponds to a multi-bit value, identifying a different transform to perform on the multi-bit result, which reduces the multi-bit value to a single bit; and
   configuring the physical unclonable function device to perform the different transform on the multi-bit result, wherein the physical unclonable function device is configured to generate an identifier based, at least in part, on a result of the different transform on the multi-bit result.

2. The method of claim 1, wherein the transform, when applied to the future output by the physical unclonable function device, divides the future output by a value that is based, at least in part, on the scale.

3. The method of claim 1, wherein identifying the transform further comprising dividing a possible value range of the future output into bins having an equal number of bit values in the possible value range.

4. The method of claim 1, wherein identifying the transform further comprising dividing a possible value range of the future output into bins having different numbers of bit values in the possible value range.

5. The method of claim 1, wherein the physical unclonable function circuitry includes one or more components having physical characteristics that randomly fall within a tolerance range during manufacture, and wherein the physical unclonable function circuitry is configured to generate the outputs with values based, at least in part, on the physical characteristics of the one or more components.

6. A device comprising:
   physical unclonable function circuitry configured to generate a plurality of outputs; and
   identifier generation circuitry configured to separately derive a bit from each of the outputs based, at least in part, on transforms determined from corresponding scales for the physical unclonable function circuitry that were set according to widths of distributions of output values capable of being generated by the physical unclonable function circuitry, wherein the identifier generation circuitry is configured to generate an identifier with the bits derived from the outputs, wherein the identifier generation circuitry is configured to determine a result of a performance of at least one of the transforms corresponds to a multi-bit value, and identify a different transform to perform on the multi-bit result, which reduces the multi-bit value to a single bit.

7. The device of claim 6, wherein the physical unclonable function circuitry includes multiple physical unclonable function units, each including one or more components having physical characteristics that randomly fall within a tolerance range during manufacture, and each configured to generate a corresponding one of the outputs based, at least in part, on the physical characteristics of the one or more components.

8. The device of claim 7, wherein the identifier generation circuitry is configured to sample multiple outputs from one of the physical unclonable function units, determine a distribution of values corresponding to the sampled outputs, and generate a transform to utilize on an output for the physical unclonable function unit.

9. The device of claim 8, wherein the identifier generation circuitry is configured to utilize the transform to derive a bit from the output of the physical unclonable function unit.

10. The device of claim 6, wherein the identifier generation circuitry is configured to utilize the different transform to reduce the multi-bit value derived from the output of the physical unclonable function unit into to a single bit.

11. An apparatus comprising at least one computer-readable memory device storing instructions configured to cause one or more processing devices to perform operations comprising:
    determining a distribution of values in outputs sampled from a physical unclonable function unit in a physical unclonable function device;
    setting a scale for the physical unclonable function unit based, at least in part, on a width of the distribution of values in the sampled outputs;
    identifying a transform to perform on a future output of the physical unclonable function unit based, at least in part, on the scale for the physical unclonable function unit;
    configuring the physical unclonable function device to perform the transform on the future output of the physical unclonable function unit, wherein the physical unclonable function device is configured to generate an identifier based, at least in part, on a result of performance of the transform on the future output of the physical unclonable function unit;
    when the result of the performance of the transform on the future output of the physical unclonable function unit corresponds to a multi-bit value, identifying a different transform to perform on the multi-bit result, which reduces the multi-bit value to a single bit; and
    configuring the physical unclonable function device to perform the different transform on the multi-bit result, wherein the physical unclonable function device is configured to generate an identifier based, at least in part, on a result of the different transform on the multi-bit result.

12. The system of claim 11, wherein the transform, when applied to the future output by the physical unclonable function device, divides the future output by a value that is based, at least in part, on the scale.

13. The system of claim 11, wherein identifying the transform further comprising dividing a possible value range of the future output into bins having an equal number of bit values in the possible value range.

14. The system of claim 11, wherein identifying the transform further comprising dividing a possible value range of the future output into bins having different numbers of bit values in the possible value range.

15. The system of claim 11, wherein the physical unclonable function device includes one or more components having physical characteristics that randomly fall within a tolerance range during manufacture, and wherein the physical unclonable function device is configured to generate the outputs with values based, at least in part, on the physical characteristics of the one or more components.

* * * * *